United States Patent
Oh et al.

(10) Patent No.: US 10,142,079 B2
(45) Date of Patent: Nov. 27, 2018

(54) METHOD AND APPARATUS FOR MANAGING CONTENTION WINDOW IN WIRELESS COMMUNICATION SYSTEM

(71) Applicant: Samsung Electronics Co., Ltd., Suwon-si, Gyeonggi-do (KR)

(72) Inventors: Jin-Young Oh, Seoul (KR); Dong-Han Kim, Osan-si (KR); Seung-Hoon Choi, Seongnam-si (KR); Jeong-Ho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/154,558

(22) Filed: May 13, 2016

(65) Prior Publication Data

US 2016/0338054 A1 Nov. 17, 2016

Related U.S. Application Data

(60) Provisional application No. 62/161,398, filed on May 14, 2015.

(51) Int. Cl.
*H04L 5/00* (2006.01)
*H04W 74/08* (2009.01)

(52) U.S. Cl.
CPC ....... *H04L 5/0055* (2013.01); *H04W 74/0841* (2013.01); *H04L 5/0007* (2013.01)

(58) Field of Classification Search
None
See application file for complete search history.

(56) References Cited

U.S. PATENT DOCUMENTS

| 2004/0100986 | A1 | 5/2004 | Lee et al. | |
|---|---|---|---|---|
| 2005/0157696 | A1* | 7/2005 | Yamamoto | H04L 1/0019 370/349 |
| 2009/0262678 | A1* | 10/2009 | Oyman | H04B 7/024 370/315 |

(Continued)

FOREIGN PATENT DOCUMENTS

KR    10-2014-0075477 A    6/2014

OTHER PUBLICATIONS

Ericsson, Discussion on LBT Protocols, R1-152326, Apr. 25, 2015.
(Continued)

*Primary Examiner* — Otis L Thompson, Jr.
(74) *Attorney, Agent, or Firm* — Jefferson IP Law, LLP

(57) ABSTRACT

A base station is provided. The base station transmits multiple data in a first subframe, receives response signals corresponding to the multiple data, determines a ratio of negative acknowledge (NACK) signals to the response signals, and adjusts or maintains a contention window based on the determined ratio. The present disclosure relates to communication schemes for combining 5th-generation (5G) communication systems with internet of things (IoT) technology to support higher data transmission rate as post-4th-generation (post-4G) systems and systems for the same. The present disclosure may be used in intelligent services (e.g., smart home, smart building, smart city, smart car, or connected car, health-care, digital education, retail business, security and safety-related services, etc.) based on the 5G communication technology and IoT-related techniques.

20 Claims, 7 Drawing Sheets

(56) References Cited

U.S. PATENT DOCUMENTS

| | | |
|---|---|---|
| 2012/0300712 A1 | 11/2012 | Hakola et al. |
| 2015/0049708 A1 | 2/2015 | Damnjanovic et al. |
| 2015/0055541 A1 | 2/2015 | Zhang et al. |
| 2016/0057770 A1* | 2/2016 | Yerramalli ........... H04B 7/0811 370/329 |
| 2016/0142192 A1* | 5/2016 | Damnjanovic ... H04W 74/0816 370/329 |
| 2016/0345326 A1* | 11/2016 | Yerramalli ........ H04W 72/0453 |
| 2017/0005768 A1* | 1/2017 | Yin ....................... H04L 5/0055 |
| 2017/0027002 A1* | 1/2017 | Yerramalli .......... H04W 74/004 |
| 2017/0041957 A1* | 2/2017 | Pazhyannur ...... H04W 74/0808 |
| 2017/0048718 A1* | 2/2017 | Kim ..................... H04W 16/14 |
| 2017/0055296 A1* | 2/2017 | Cheng ............... H04W 74/0841 |
| 2017/0171883 A1* | 6/2017 | Noh .................... H04W 74/004 |

OTHER PUBLICATIONS

Huawei et al., Performance comparison of LBT categories, R1-150977, Mar. 21, 2015.
Huawei et al., Description of candidate LBT schemes, R1-150978, Mar. 17, 2015.
IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, XP017603728, Jan. 1, 2003.
European Search report dated Jan. 22, 2018, issued in European application No. 16793044.5.

\* cited by examiner

METHOD AND APPARATUS FOR MANAGING CONTENTION WINDOW IN WIRELESS COMMUNICATION SYSTEM

CROSS-REFERENCE TO RELATED APPLICATION(S)

This application claims the benefit under 35 U.S.C. § 119(e) of a U.S. Provisional application filed on May 14, 2015 in the U.S. Patent and Trademark Office and assigned Ser. No. 62/161,398, the entire disclosure of which is hereby incorporated by reference.

TECHNICAL FIELD

The present disclosure relates to methods and apparatuses for managing a contention window in wireless communication systems.

BACKGROUND

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The internet is evolving from the human-centered connection network by which humans create and consume information to the internet of things (IoT) network by which information is communicated and processed between things or other distributed components. The internet of everything (IoE) technology may be an example of a combination of the big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC).

In the IoT environment may be offered intelligent internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5G communication system to the IoT network. For example, the sensor network, M2M, MTC, or other 5G techniques are implemented by schemes, such as beamforming, MIMO, and array antenna schemes. The above-mentioned application of the cloud radio access network as a big data processing technique may be said to be an example of the convergence of the 5G and IoT technologies.

Recent mobile communication systems are evolving to high-speed, high-quality wireless packet data communication systems to provide data services and multimedia services beyond the initial versions that have provided voice-centered services. Recently there have been developed to support high-speed, high-quality wireless packet data transmission services, various mobile communication standards, such as 3rd generation partnership project (3GPP) high speed downlink packet access (HSDPA), high speed uplink packet access (HSUPA), LTE, LTE-advanced (LTE-A), 3GPP2 high rate packet data (HRPD), and institute of electrical and electronics engineers (IEEE) 802.16. In particular, the LTE/LTE-A system (hereinafter, LTE system) happened to have the maximum frequency efficiency while undergoing continuous development of standards and evolution.

Further, data transmission rate and system capability have been maximized using carrier aggregation (CA) by which the system may be operated via multiple frequency bands. However, the frequency band operated by the current LTE system is the licensed band (the licensed spectrum or licensed carrier) which the service provider generally has a dedicated right to use. Generally, since the frequency band (e.g., a 5 GHz or less frequency band) on which mobile communication services are now being offered is already occupied and used by other service providers or other communication systems, the service provider has difficulty securing and operating multiple licensed bands to expand the system capability.

There are being recently researched techniques to utilize, for the LTE system, the unlicensed band (unlicensed spectrum or unlicensed carrier) relatively easy to secure in order to process mobile data that explosively increases and to address the issue of securing frequency. Among frequency bands in unlicensed bands, particularly the 5 GHz band is used by a relatively small number of devices and allows for utilization of a significantly wide bandwidth. Accordingly, the use of the 5 GHz unlicensed band facilitates to maximize the LTE system capacity.

For example, multiple frequency bands may be utilized based on the CA technique which is one major technology for the LTE system. That is, the LTE cell on the licensed band and the LTE cell (licensed assisted access (LAA) cell or LTE-unlicensed spectrum (LTE-U) cell) on the unlicensed band may be considered the primary cell (PCell (or Pcell)) and the secondary cell (SCell (or Scell)), respectively, to operate the LTE system on the unlicensed band in a manner equal or similar to the legacy CA environment. In this case, the LTE system may be applicable to the dual-connectivity environment where the licensed band and the unlicensed band are connected with each other via a non-ideal backhaul as well as the CA where the licensed band and the unlicensed band are connected with each other via an ideal backhaul.

The orthogonal frequency division multiplexing (OFDM) scheme typically used in the LTE system transmits data via multiple carriers, and this is a sort of multi-carrier modulation scheme that parallelizes symbol sequences inputted in series and modulates the same into multiple multi-carriers, i.e., multiple subcarrier channels with mutual orthogonality and transmits the same.

In the OFDM scheme, a modulated signal is positioned in a 2-dimensional resource constituted of time and frequency. The resources on the time axis are differentiated by different OFDM symbols and they are orthogonal to each other. The resources on the frequency axis are differentiated by different subcarriers and they are also orthogonal to each other. In the OFDM scheme, one minimum unit resource may be indicated by designating a particular OFDM symbol on the time axis and a particular subcarrier on the frequency axis, and this is called a resource element (RE). Since different REs maintain the orthogonality even when undergoing frequency selective channel, signals transmitted via different REs may be received on the reception side without mutual interference.

The physical channel is a channel of a physical layer transmitting a modulated symbol obtained by modulating one or more coded bit streams. The orthogonal frequency division multiple access (OFDMA) system configures and transmits a plurality of physical channels depending on the receiver or the purpose of information streams transmitted. The RE where one physical channel should be disposed and transmitted should be previously agreed between the transmitter and the receiver, and such rule is referred to as mapping.

In the OFDM communication system, a downlink bandwidth includes multiple resource blocks (RBs), and each physical RB (PRB) may include 12 subcarriers arranged along the frequency axis and 14 or 12 OFDM symbols arranged along the time axis. Here, the PRB is a basic unit for resource allocation.

The reference signal (RS) is a signal transmitted by the base station for a user equipment (UE) to perform channel estimation. The RSs for the LTE communication system include the common RS (CRS) and the demodulation RS (DMRS) which is a dedicated RS.

The CRS is an RS transmitted over the overall downlink band and receivable by all the UEs and is used for channel estimation, configuring feedback information by the UE, and demodulation of data channel. The DMRS is an RS transmitted over the overall downlink band. The DMRS is used for demodulation of a data channel by a particular UE and channel estimation, but not used for configuring feedback information unlike the CRS. Accordingly, the DMRS is transmitted through a PRB resource that is to be scheduled by the UE.

A subframe on the time axis consists of two 0.5 msec-long slots, i.e., a first slot and a second slot. The physical dedicated control channel (PDCCH) region that is a control channel region and the ePDCCH (enhanced PDCCH) region that is a data channel region are separately transmitted on the time axis. This is for quickly receiving and demodulating control channel signals. Further, the PDCCH region is positioned on the overall downlink band and this has the form that one control channel is split into smaller units of control channels that are distributed and positioned over the entire downlink band.

The uplink generally comes largely in the physical uplink control channel (PUCCH), which is a control channel and a physical uplink shared channel (PUSCH), which is a data channel. A response signal and other feedback information for the downlink data channel, unless there is a data channel, are transmitted through a control channel, and if any data channel, through the data channel.

Meanwhile, a base station in an LTE cell may communicate with a UE using an unlicensed band in addition to the existing licensed band that it is using. In such case, the LTE cell where the licensed band is available may be denoted as a PCell, and the LAA cell where the unlicensed band is available may be denoted as an SCell.

When the base station uses the unlicensed band, it needs to perform, e.g., a channel occupancy operation appropriate for the unlicensed band. However, the legacy operation of unlicensed band has something inappropriate for the communication characteristics of the LTE cell base station and suffers from the issue that the operation of the base station is not smoothly done on the unlicensed band. For example, although the contention window on the unlicensed band is configured based on a response signal received from one UE, the base station may receive response signals from multiple UEs at the same time which renders ambiguous standards for configuring the contention window. Thus, there is required a method for the base station to smoothly perform communication on the unlicensed band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for managing a contention window in a wireless communication system.

According to an embodiment of the present disclosure, there are proposed a method and apparatus for accessing a channel of an unlicensed band in a wireless communication system.

Another aspect of the present disclosure is to provide a channel occupancy method and apparatus by a base station on an unlicensed band.

Another aspect of the present disclosure is to provide a method and apparatus for allowing an unlicensed band to be used as an additional channel for communication.

In accordance with an aspect of the present disclosure, a method for managing a contention window by a base station in a wireless communication system is provided. The method includes transmitting multiple data in a first subframe, receiving response signals corresponding to the multiple data, determining a ratio of negative acknowledge (NACK) signals to the response signals, and adjusting or maintaining the contention window based on the determined ratio.

In accordance with another aspect of the present disclosure, a base station in a wireless communication system is provided. The base station includes a transmitter configured to transmit multiple data in a first subframe, a receiver configured to receive response signals corresponding to the multiple data, and a controller configured to determine a ratio of NACK signals to the response signals and adjusting or maintaining the contention window based on the determined ratio.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings it should be noted that like reference numbers are used to depict the same or similar elements, features, and structures.

DETAILED DESCRIPTION

Figure 1A:
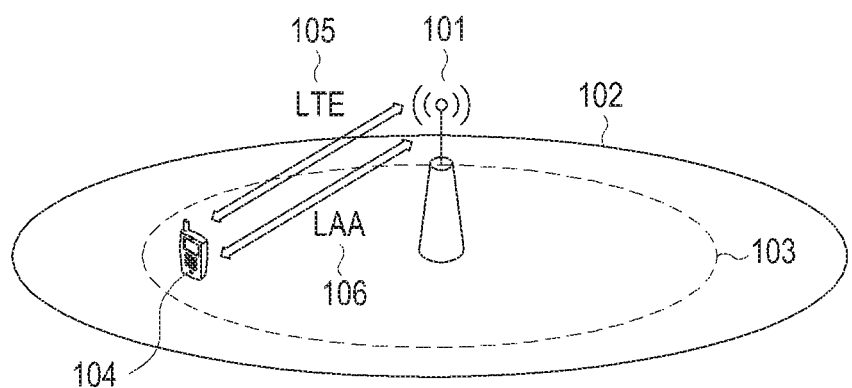
FIG. 1A is a view illustrating an example of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to going into the detailed description of the present disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to," "be bound to or with," "have," or "have a property of" As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Hereinafter, according to the present disclosure, the long term evolution (LTE) system and the LTE-advanced (LTE-A) system are described as examples, but the present disclosure may also apply to other communication systems using a licensed band and unlicensed band without limited thereto.

FIG. 1A is a view illustrating an example of a wireless communication system according to an embodiment of the present disclosure.

Referring to FIG. 1A, the wireless communication system includes a base station 101 and a user equipment (UE) 104. The base station 101 may be, e.g., a small base station. The cell of the base station 101 may include an LTE cell 102 and a licensed assisted access (LAA) cell 103. The LTE cell 102 denotes a cell where the UE 104 uses a licensed band 105 to perform data communication with the base station 101. The LAA cell 103 denotes a cell where the UE 104 uses an unlicensed band 106 to perform data communication with the base station 101. There is no limitation on the duplex scheme of the LTE cell 102 or LAA cell 103. However, uplink transmission may be limited as performed only through the LTE cell 102 when the LTE cell 102 is a primary cell (PCell).

Figure 1B:
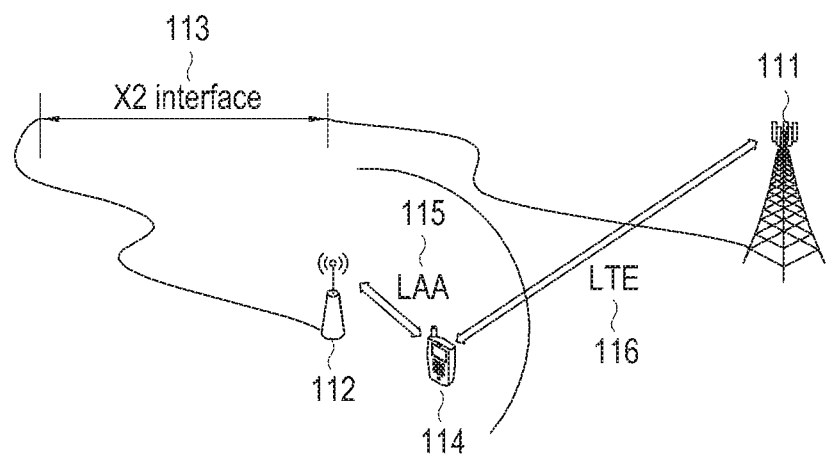
FIG. 1B is a view illustrating another example of a wireless communication system according to an embodiment of the present disclosure.

FIG. 1B is a view illustrating another example of a wireless communication system according to an embodiment of the present disclosure.

Referring to FIG. 1B, the wireless communication system may include an LTE macro base station 111 for broad coverage in the network and an LAA small base station 112 for increasing the amount of data transmitted. The UE 114 may perform data communication with the LTE macro base station 111 using the licensed band 116 and data communication with the LTE macro base station 111 using the unlicensed band 115. There is no limitation on the duplex scheme of the LTE macro base station 111 or LAA small base station 112. However, uplink transmission may be configured to be performed only through the LTE macro base station 111 when the LTE macro base station 111 is a PCell. Here, the LTE macro base station 111 and the LAA small base station 112 may have an ideal backhaul network that is based on a base station interface, such as an X2 interface 113. Thus, quick inter-base station communication is possible, and even when uplink transmissions are sent only to the LTE macro base station 111, the LAA small base station 112 may receive, in real-time, relevant control information from the LTE macro base station 111 through inter-base station communication.

Generally, for the unlicensed band, the same frequency band is shared and used by a plurality of devices. At this time, the devices using the unlicensed band may be of the same or different systems. Accordingly, typical operations of the devices operated on the unlicensed band for mutual co-existence among various devices are as follows. A transmission device requiring signal transmission including data or control signals identifies the channel occupancy state by other devices for the radio channel which are to perform signal transmission and radio channel previously selected, and depending on the determined channel occupancy state, may or might not occupy the channel. Such operation is generally called listen-before-talk (LBT).

In other words, the transmitter should sense the channel during a predetermined time and determine whether the channel is occupied. At this time, the time to sense the channel may be previously defined or arbitrarily selected. Further, the channel sensing time may be set in proportion to a maximum channel occupancy time as set. The channel sensing operation to determine whether to occupy the channel may be set differently depending on unlicensed frequency bands, regions, or per-country regulations. For example, in the U.S., the unlicensed band may be used without a separate channel sensing operation other than the operation for radar sensing on the 5 GHz frequency band.

The transmitter intending to use an unlicensed band, when not sensing other devices using the channel through the channel sensing operation (or LBT), can use the channel. Here, upon operation, the devices using the unlicensed band may set the maximum channel occupancy time during which they may occupy the channel. Here, the maximum channel occupancy time may be previously set as per a defined regulation or based on information received from other device. For example, the UE may set the maximum channel occupancy time by receiving configured information from the base station.

Further, the maximum channel occupancy time may be set differently depending on different unlicensed bands or per-local or per-country regulations. For example, in Japan, the maximum channel occupancy time on the unlicensed band of 5 GHz is limited to 4 ms. By contrast, in Europe, the channel may be occupied and used for up to 10 ms or 13 ms. Accordingly, devices using unlicensed band may use the channel for the maximum channel occupancy time set by the corresponding band and local or central governmental regulations. The devices having occupied the channel during the maximum channel occupancy time, in order to reoccupy the channel, performs the channel sensing operation again and they may occupy or not depending on whether other devices use the band.

The channel sensing and occupying operations on the unlicensed band are described in detail with reference to FIG. 2.

Figure 2:
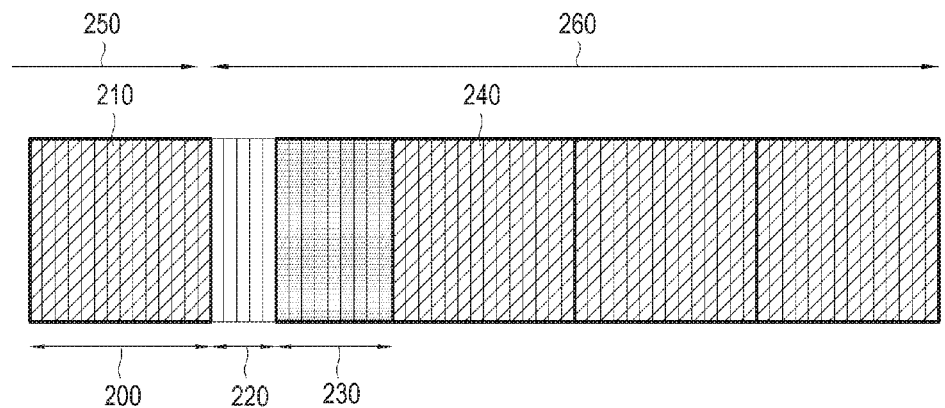
FIG. 2 is a view illustrating a structure of a subframe for a channel sensing and occupying operation on an unlicensed band according to an embodiment of the present disclosure.

FIG. 2 is a view illustrating a structure of a subframe for a channel sensing and occupying operation on an unlicensed band according to an embodiment of the present disclosure.

Referring to FIG. 2, a process in which the base station transmits data or control signals to the UE is described as an example. However, embodiments of the present disclosure are not limited to the example where the base station transmits signals to the UE and may rather apply to situations where the UE transmits signals to the base station and have various applications in signal transmission between devices using the unlicensed band.

Referring to FIG. 2, a 1 ms-long subframe 200 includes a plurality of orthogonal frequency division multiplexing (OFDM) symbols. The base station and the UE communicable on the unlicensed band using the unlicensed band may occupy the channel to perform communication during a preset channel occupancy time (or transmission opportunity (TXOP)) 250. In a case where the base station has an additional signal supposed to be transmitted when the preset channel occupancy time 250 expires, the base station performs a channel sensing operation in a channel sensing interval 220. The base station may reoccupy and use the channel depending on the result of the channel sensing operation.

The channel sensing interval 220 may be previously set between the base station and the UE or may be set and transferred by the base station to the UE through, e.g., higher layer signaling. Here, the channel sensing interval 220 may be set differently depending on frequency bands or locally or per-country regulations defined. Further, the channel sensing interval 220 may be set in proportion to the channel occupancy time 250. As an example, among the regulations on the 5 GHz band in Europe, the channel sensing and occupying operations for load-based equipment are described as an example.

When the base station needs additional use of the channel after the maximum channel occupancy time, it determines whether other devices occupy the channel during a minimum channel sensing interval. Here, the minimum channel sensing interval may be determined by the following Equation 1 depending on the maximum channel occupancy interval.

$$\text{maximum channel occupancy interval, } 13/32 \times q, (q=4, \ldots, 32)$$

$$\text{minimum channel sensing interval, ECCA slot} \times \text{rand}(1, q) \quad \text{Equation 1}$$

In Equation 1 above, extended clear channel assessment (ECCA) slot denotes the minimum unit of the arbitrarily set channel sensing interval, and rand(1, q) denotes a value arbitrarily selected from values 1 to q. Accordingly, the minimum channel sensing interval may be the multiple of ECCA slot and the arbitrarily selected value. Meanwhile, the maximum channel occupancy interval may be determined based on q. For example, when q is set to 32 (q=32), the maximum channel occupancy interval may be 13 ms. Accordingly, the corresponding device may occupy the channel for up to 13 ms. As such, since the maximum channel occupancy interval and the minimum channel sensing interval may increase or decrease depending on q, the minimum channel sensing interval may be set to increase as the maximum channel occupancy interval increases.

Meanwhile, as set forth in Equation 1, the method for setting the maximum channel occupancy interval and the minimum channel sensing interval is a mere example, may be applied differently depending on frequency bands or locally or per-country regulations defined, and may be changed in the future as the frequency regulations are modified. Further, additional operations (e.g., introduction of additional channel sensing intervals) other than the channel sensing operation according to the frequency regulation may be included.

Not sensing other devices to use the unlicensed band during the channel sensing interval 220, that is, when the unlicensed band channel is determined to be in an idle state, the base station may immediately occupy and use the channel. Here, the determination as to whether other devices occupy the channel during the channel sensing interval 220 may be defined in advance or may be made using a preset threshold value.

For example, when the magnitude of signals received from the other devices during the channel sensing interval is larger than a predetermined threshold value (e.g., −62 dBm), the channel may be determined to have been occupied by the other devices. If the magnitude of the signal received is equal or smaller than the threshold value, the base station may determine that the channel is in an idle state. The determination as to whether other devices occupy the channel during the channel sensing interval 220 may be performed based on various methods including, e.g., a method for detecting a pre-defined signal, in addition to the method based on the magnitude of received signals.

The base station may sense an idle channel and start channel occupancy in a particular OFDM symbol interval in the subframe depending on the result of channel sensing during the channel sensing interval 220. However, since the general LTE system operates in subframe units, (e.g., performing signal transmission and reception from the first OFDM symbol of the subframe), it might not transmit or receive signals in a particular OFDM symbol as described above. Accordingly, when sensing the idle channel during the channel sensing interval 220 of the subframe, the base station may transmit a signal for channel occupancy during an interval 230 from when the channel sensing interval 220 expires to immediately before the first OFDM symbol of a next subframe is transmitted.

Specifically, before transmitting a first signal (e.g., a control signal and data signal) transmitted in the subframe 210 or 240, the base station may transmit a second signal (e.g., a first sync signal (primary synchronization signal (PSS)/secondary synchronization signal (SSS)/common reference signal (CRS) or a newly defined signal) in order to occupy the channel for the unlicensed band. The second signal might not be transmitted depending on the time when the channel sensing operation terminates. Further, when the time when the channel starts to be occupied is set to be within a particular OFDM symbol, the base station may transmit a newly defined third signal until a next OFDM symbol starts and may then transmit the second signal or first signal. For ease of description, the channel sensing interval 220 is described using OFDM symbol units, but the channel sensing interval 220 may be set regardless of the OFDM symbol of the LTE system.

The second signal may include a signal generated by recycling the PSS/SSS/CRS, using a sequence different from the root sequence being used by the current licensed band, or using at least one of the PSS and the SSS. Further, the second signal may be generated using a sequence other than the PSS/SSS sequence necessary for generating an unlicensed band base station unique value (Cell ID) and may be used not to be confused with the base station unique value.

Further, the second signal may include at least one of the CRS or the channel state information RS (CSI-RS), the (enhanced) physical dedicated control channel ((E)PDCCH) or physical downlink shared channel (PDSCH) or a signal which is a modification to the signal.

The interval 230 during which the second signal is transmitted is included in the channel occupancy time, and thus, the frequency efficiency may be maximized when minimum information may be transferred through the second signal.

The LTE system using the unlicensed band as described above (hereinafter, LAA or LAA cell) is required to meet the regulations for the unlicensed band to be used and requires a new-type channel access (or LBT) scheme different from the existing one using the licensed band for co-existence with other systems (hereinafter Wi-Fi) using the unlicensed band. A channel access scheme for using the unlicensed band of the Wi-Fi system is briefly described below with reference to FIG. 3.

Figure 3:
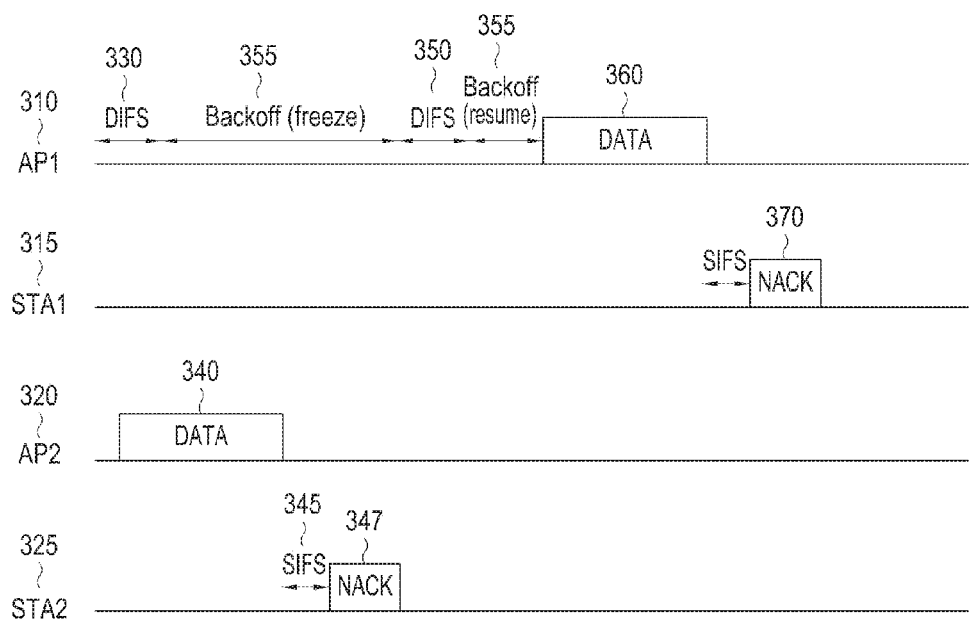
FIG. 3 is a view illustrating a channel access scheme for an unlicensed band of a Wi-Fi system according to an embodiment of the present disclosure.

FIG. 3 is a view illustrating a channel access scheme for an unlicensed band of a Wi-Fi system according to an embodiment of the present disclosure.

Referring to FIG. 3, the AP1 310, which is a Wi-Fi access point (AP), should perform a channel sensing operation for a channel to occupy the channel when required to transmit data to the STA1 315, which is a first UE. Here, the channel is typically sensed during a distributed coordination function interframe space (DIFS) interval 330. The AP1 310 may occupy the channel to transmit data to the UE when determining that the channel is idle during the DIFS interval 330. The operation of determining whether to occupy the channel during the DIFS interval 330 may be performed by various methods, such as determining whether the channel is occupied based on, e.g., the strength of signal received during the time or whether a previously defined signal is detected. When determined that the channel is occupied by another device, such as AP2 320, during the DIFS interval 330, the AP1 310 selects any value N within a preset contention window (e.g., 1 to 16). The AP1 310 configures a backoff interval 355 having a length of the selected N and performs a backoff operation.

The AP1 310 senses the channel during a predetermined time (e.g., 9 us), and upon determining that the channel is in the idle state, deducts from N to reduce the backoff interval 355 (i.e., N=N−1). In contrast, upon determining that other device occupies the channel during a preset time, the AP1 310 may maintain the backoff interval 355 without changing N.

When the STA2 325, which is a second UE, receives data 340 transmitted from the AP2 320, the STA2 325 transmits an acknowledge (ACK) or negative ACK (NACK) 347 for the reception of data 340 to the AP2 320 after a short interframe space (SIFS) time 345. Here, the STA2 325 may transmit the ACK/NACK (A/N) 347 without performing a separate channel sensing operation. After the STA2 325 terminates the transmission of the ACK or NACK 347, the AP1 310 may be aware that the channel is idle. Here, the AP1 310 senses the channel during a preset time (e.g., 9 us) after the DIFS interval 350. The AP1 310 deducts from N when determining that the channel is idle and sets the backoff interval 357 (That is, N=N−1).

When N=0, the AP1 310 may occupy the channel and transmit data 360 to the STA1 315. Then, the STA1 315 may receive the data 360, and after the SIFS, the STA1 315 may transmit an ACK or NACK 370 for the reception of the data to the AP1 310. When the AP1 310 receives the NACK from the STA1 315, the AP1 310 increases the contention window and selects a value N within the increased contention window. For example, when the contention window is [1,16], the AP1 310 receiving the NACK may change the contention window into [1,32] and select a number, N, from 1 to 32.

In the case of the Wi-Fi system, communication is generally performed between one AP (or base station) and one STA (or UE) in the same time. Further, as denoted with reference numbers 347 and 370 of FIG. 3, the STA transmits a data reception state (e.g., an ACK or NACK) to the AP (or base station) right after reception of the data. At this time, the AP1 310 or the AP2 320 performs a next data transmission operation after receiving the ACK or NACK from the STA1 315 or the STA2 325.

In the case of LAA system, however, the base station may transmit data to a plurality of UEs in the same time. Further, one or more UEs receiving the data at the same time (e.g., time n) may transmit ACKs or NACKs to the base station at the same time (e.g., n+4 for the frequency division duplexing (FDD)). Accordingly, the LAA base station may receive ACKs or NACKs from one or more UEs at the same time unlike the Wi-Fi system. Further, at least 4 ms or more of data transmission time gap may occur between the time when the UE transmits the A/N and the time when the base station transmits data. That is, when the LAA base station configures a contention window by the transmission of A/N from the UE as in the Wi-Fi, the base station can receive A/Ns from a plurality of UEs at a particular time, and thus, ambiguity may arise in configuring the contention window. Further, the time of applying the contention window (re)set is unclear due to a transmission delay of A/N from the UE.

Accordingly, according to an embodiment of the present disclosure, there are proposed a method and apparatus by which an LAA base station may more clearly configure a contention window based on A/N information received from a UE.

According to an embodiment of the present disclosure, there are described a method and apparatus that allow an LTE system to be properly operated on an unlicensed band by reflecting the operational characteristics on the unlicensed band as described above.

Although only carrier aggregation (CA) environments are assumed and described for ease of description according to an embodiment of the present disclosure, the present disclosure is not limited thereto and may also be applicable to stand-alone environments in which it operates only under dual-connectivity or unlicensed band environments.

Further, according to an embodiment of the present disclosure, the description primarily focuses on the downlink where transmission occurs from the base station to the UE in the general LTE system for ease of description. That is, the transmission device requiring signal transmission is represented as the base station, and the transmission device requiring signal reception is represented as the UE. However, the present disclosure may also be applicable to the uplink where transmission occurs from the UE to the base station without limitations as well as the downlink and may apply in the operation of the general transmission device or reception device.

Hereinafter, a process in which the base station of the LTE cell (hereinafter, a "LAA cell") occupies an unlicensed band to perform data transmission is described with reference to FIG. 4.

Figure 4:
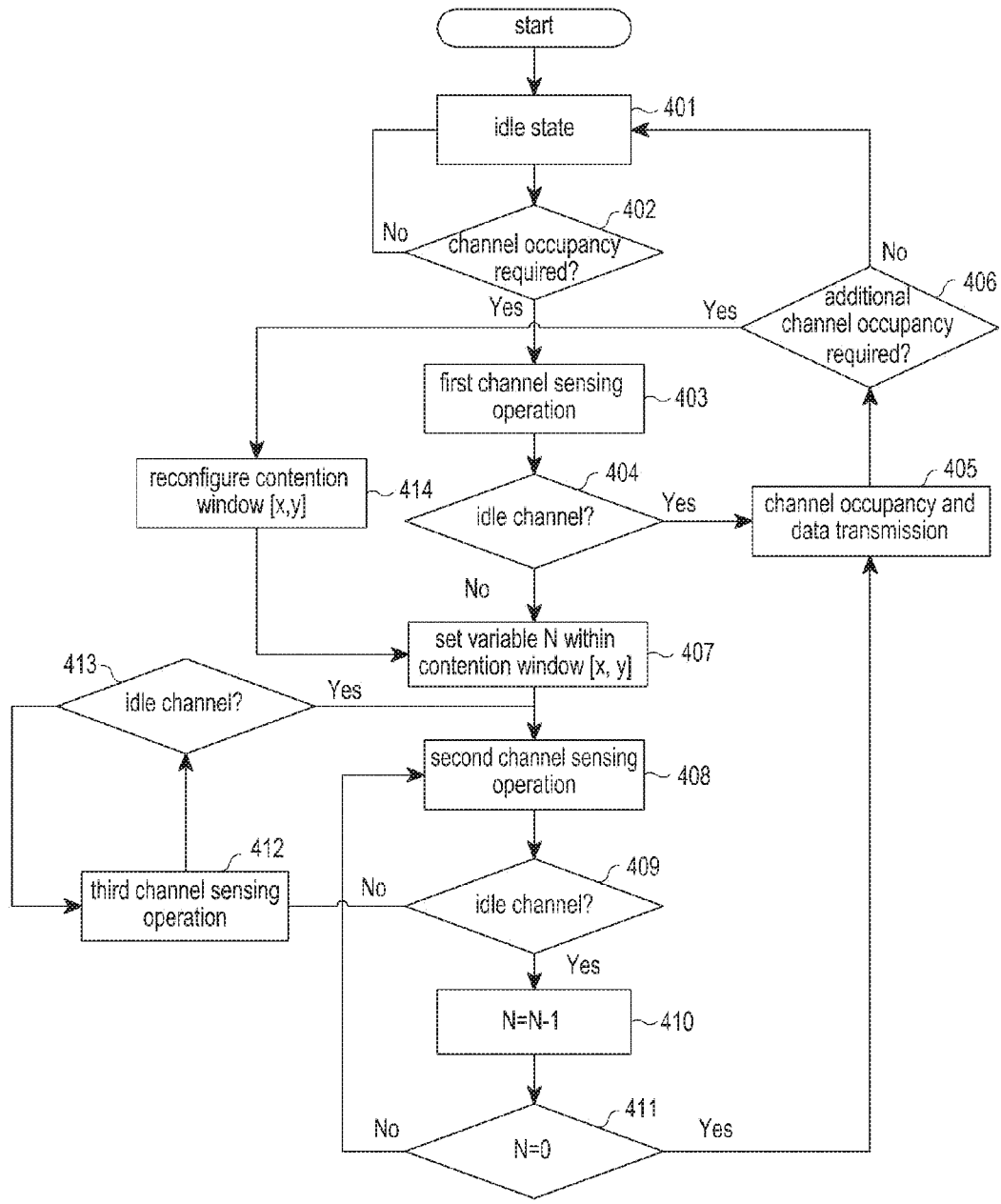
FIG. 4 is a flowchart illustrating a process in which a licensed assisted access (LAA) cell occupies a channel of an unlicensed band to perform data transmission according to an embodiment of the present disclosure.

FIG. 4 is a flowchart illustrating a process in which an LAA cell occupies a channel of an unlicensed band to perform data transmission according to an embodiment of the present disclosure.

Referring to FIG. 4, the LAA cell maintains the idle state where no data transmission is required in operation 401. The idle state includes a state where the LAA cell does not transmit data on the unlicensed band.

The LAA cell determines whether channel occupancy is needed for data transmission in operation 402. When determining that channel occupancy is needed, the LAA cell performs a first channel sensing operation in operation 403. Here, the LAA cell may set the contention window used for a second channel sensing operation as an initial value. The first channel sensing operation includes an operation for determining the channel occupancy state based on at least one of the strength of a signal received during a preset time and whether a pre-defined signal is detected. The first channel sensing time during which the first channel sensing operation may be performed may be set as a preset value or reset by the base station.

When determining that the channel is in the idle state as a result of the first channel sensing operation in operation 404, the LAA cell may occupy the channel and transmit data in operation 405. In contrast, when determining that the channel is occupied by other devices in operation 404, the LAA cell may select a variable N within the contention window [x, y] set in operation 407. Here, the contention window may be previously set or (re)set by the base station. Further, the contention window may be set using, e.g., the number of times of attempting to occupy the channel, occupancy rate for the channel (e.g., traffic load), or result of receiving data signals transmitted upon channel occupancy by the UE (e.g., A/N).

For example, when the LAA cell occupying the channel in operation 405 is determined to additionally need to occupy the channel in operation 406, the contention window may be reset in operation 414 based on the result of the data transmission performed in operation 405. Here, the scheme of resetting the contention window using the data transmission result is a mere example, and the contention window may be reset by a preset value or the operation of previously occupying the channel and transmitting data.

For example, when transmitting data to the UE during the configuration information and receiving an NACK as a result of the data transmission from the UE, the LAA cell may increase the contention window. When the LAA cell occupying the increased contention window transmits data to the UE during the channel occupancy interval and receives an ACK as a result of reception for the data transmission from the UE, the LAA cell may reduce the contention window or set the contention window as an initial value. The scheme of configuring the contention window using the A/N is a mere example, and the contention window may be reset using other references.

When a variable N is set during the contention window in operation 407, the LAA cell may perform the second channel sensing operation in operation 408. The second channel sensing operation may be the same as the first channel sensing operation or may be performed during a second channel sensing time shorter than the first channel sensing time. For example, the first channel sensing time may be set to 34 us, and the second channel sensing time may be set to 9 us.

The second channel sensing operation may include an operation for determining the channel occupancy state based on at least one of the strength of signal received during a preset time and whether a predetermined signal is detected and may be set to be different from the first channel sensing operation. When determining that the channel sensed in operation 408 is an idle channel in operation 409, the LAA cell deducts one from the variable N in operation 410. When the value N deducted in operation 411 is 0, the LAA cell may perform channel occupancy and data transmission in operation 405.

Meanwhile, unless the variable N is 0 in operation 411, the LAA cell may perform the second channel sensing operation again in operation 408. When the channel sensed in operation 408 is determined not to be an idle channel in operation 409, the LAA cell may perform a third channel sensing operation in operation 412. The third channel sensing operation may be set to be the same as the first channel sensing operation or the second channel sensing operation. Further, the third channel sensing operation may be set to perform the operation of creating a time delay without a separate channel sensing or channel occupancy operation.

The third channel sensing time during which the third channel sensing operation may be performed may be set to be the same or different from at least one of the first channel sensing time or the second channel sensing time. When the third channel sensing operation is set to be the same as the first channel sensing operation or the second channel sensing operation, the LAA cell determines a result of the channel sensing in operation 413. When the channel sensed by the third channel sensing operation is in the idle state in operation 413, the LAA cell may perform the second channel sensing operation again in operation 408. When determining that the sensed channel is not in the idle state in operation 413, the LAA cell performs the third channel sensing operation in operation 412.

As set forth above, a contention window may be reconfigured. Here, the contention window may be set using, e.g., the number of times of attempting to occupy the channel, occupancy rate for the channel (e.g., traffic load), or result of receiving data signals transmitted upon channel occupancy by the UE (e.g., A/N). However, when the contention window may be reset using the result of receiving the transmission data signal by the UE, for the LAA that may receive A/N from one or more UEs at the same time, the reference for resetting the contention window may be unclear. Accordingly, according to the present disclosure, there is proposed a method for resetting the contention window using the result of receiving the data transmitted from the base station by the UE.

Figure 5:
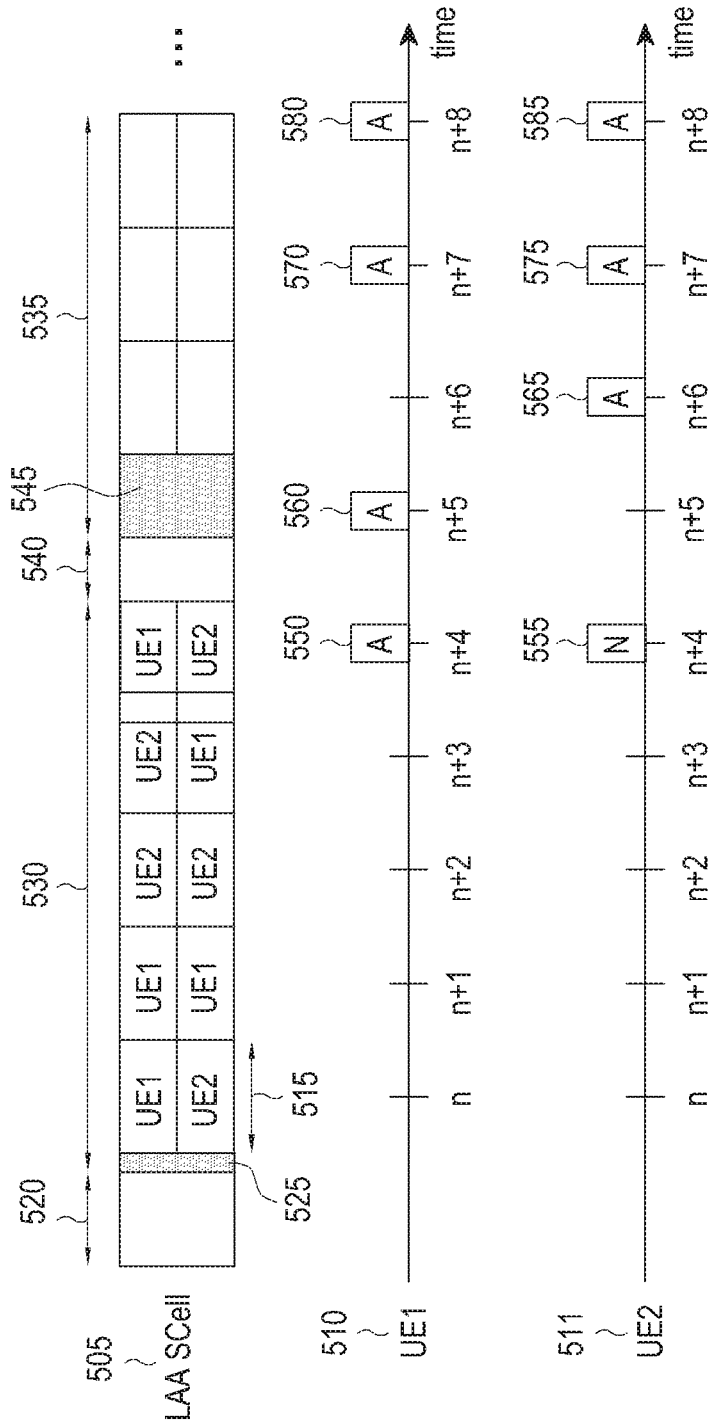
FIG. 5 is a view illustrating the temporal relation between LAA cell and user equipments (UEs) according to data communication according to an embodiment of the present disclosure.

FIG. 5 is a view illustrating the temporal relation between LAA cell and UEs according to data communication according to an embodiment of the present disclosure.

FIG. 5 illustrates an example in which the LAA cell 505 performs data communication with the UE1 510 and the UE2 511.

Referring to FIG. 5, the LAA cell 505 performs a channel sensing operation during the channel sensing interval 520 to occupy a channel determined to be in the idle state. The LAA cell 505 may perform the channel sensing operation according to the scheme described above in connection with FIG. 4. The LAA cell 505 may use the occupied channel during the channel occupancy interval 530. The LAA cell 505 may transmit a signal 525 for indicating the channel occupancy according to the time when the channel occupancy starts until before the start time 515 of the subframe. The signal for indicating the channel occupancy may include at least one of a PSS/SSS/CRS and a newly defined signal.

The LAA cell 505 may transmit data to the UE1 510 and the UE2 511 through data scheduling during the channel occupancy interval 530. The UE1 510 receives data in subframes n, n+1, n+3, and n+4 of the channel occupancy interval 530. The UE2 511 receives data in subframes n, n+2, n+3, and n+4.

The LAA cell 505 may transmit data using different frequency resources (e.g., resource blocks) for the UE1 510 and the UE2 511 in subframe n 515. For the FDD system, the UE1 510 and the UE2 511 receiving data in subframe n 515, respectively, transmit data reception results 550 and 555 to the LAA cell 505 in subframe n+4. The LAA cell 505 may perform data retransmission depending on the data reception results.

In other words, the LAA cell may transmit data to the UE1 510 and the UE2 511 during the channel occupancy interval 530 and may then receive the data reception results from the UE1 510 and the UE2 511 during the period from subframe n+4 to subframe n+8. Here, the LAA cell 505 may reset the contention window for channel sensing operation using the received data reception results.

References for the LAA cell 505 to reset the contention window may be set as follows.

Method 1. Reset contention window based on the reception result of UE for all the data transmitted during channel occupancy interval.

Method 2. Reset contention window based on the reception result of UE for data transmitted in the last time (or the last full subframe) of the channel occupancy interval.

Method 3. Reset contention window based on the reception result of UE for data transmitted before a preset time of the channel occupancy interval.

Method 4. Reset contention window based on the reception result of UE for data transmitted after a preset time of the channel occupancy interval.

Operations according to the above methods are described below. The LAA cell 505 (or base station) may transmit data to the UE1 510 and the UE2 511 during the channel occupancy interval 530 and may receive as per a defined time the result (A/N) of data reception by the UE for the data transmitted as per A/N transmission time relation between base station and UE newly defined for operation of the LAA cell 505 or duplex scheme (e.g., FDD or time division duplexing (TDD)) set for the cell. Here, the LAA cell 505 may reset the contention window for a next channel sensing operation using all or some of the data reception results received from the UE1 510 and the UE2 511.

This is described below in more detail with reference to FIG. 5. Although an example is assumed and described where the LAA cell 505 operates based on an FDD scheme for ease of description, it may also be applicable to the cases where the LAA cell 505 operates based on a TDD scheme or a separately defined scheme.

When the LAA cell 505 operates based on the FDD scheme, the UE1 510 and the UE2 511 receiving data from the LAA cell 505 in subframe n transmit the reception results 550 and 555, respectively, of the data to the LAA cell 505 in subframe n+4. Accordingly, the LAA cell 505 may receive the data reception results from the UE1 510 and the UE2 511 according to the channel occupancy interval 530 in the interval [n+4 to n+8]. Here, the interval during which A/Ns are received from the UEs to reset the contention window (hereinafter, referred to as a contention window configuration reference time) may be set as follows.

Method A-1. Time during which the LAA cell receives data reception results from all or some UEs for all the data transmitted during the channel occupancy interval of the LAA cell.

Method A-2. Time during which the LAA cell receives data reception results from all or some UEs for the data transmitted at the last data transmission time within the channel occupancy interval of the LAA cell.

Method A-3. Time during which the LAA cell receives data reception results from all or some UEs for the data transmitted at the first data transmission time within the channel occupancy interval of the LAA cell.

Method A-4. Time during which the LAA cell receives data reception results from all or some UEs for the data transmitted at a particular time within the channel occupancy interval of the LAA cell.

Method A-5. Time during which the LAA cell receives data reception results from all or some UEs for the data transmitted before or after a particular time within the channel occupancy interval of the LAA cell.

Method A-6. Time previously set or defined.

Method A-1 is described with reference to FIG. 5. The LAA cell 505 receives data reception results 550, 560, 570, 580, 555, 565, 575, and 585 from the UE1 510 and the UE2 511 in the interval [n+4 to n+8] for the data transmitted during the channel occupancy interval 530. The interval [n+4 to n+8] may be set as the contention window configuration reference time for resetting the contention window. That is, the LAA cell 505 may set the interval for receiving the data reception results of the UE for the data transmitted during a particular channel occupancy interval as the contention window configuration reference time for resetting the contention window.

Method A-2 is described with reference to FIG. 5. The LAA cell 505 receives data reception results 550, 560, 570, 580, 555, 565, 575, and 585 from the UE1 510 and the UE2 511 in the interval [n+4 to n+8] for the data transmitted during the channel occupancy interval 530. Here, the LAA cell 505 may set the interval n+8 for receiving the data reception results 550 and 555 of the UEs 510 and 511 for the data transmitted in the last subframe n+4 having the last data transmission time (or 1 ms subframe 515) requiring A/N transmission of the channel occupancy interval 530 as the contention window configuration reference time for resetting the contention window.

Method A-3 is described with reference to FIG. 5. The LAA cell 505 receives data reception results 550, 560, 570, 580, 555, 565, 575, and 585 from the UE1 510 and the UE2 511 in the interval [n+4 to n+8] for the data transmitted during the channel occupancy interval 530. Here, the LAA cell 505 may set the interval n+4 for receiving the data reception results of the UE for data transmitted in the first subframe n having the first data transmission time (or 1 ms subframe) requiring the A/N transmission of the channel occupancy interval 530 as the contention window configuration reference time for resetting the contention window.

Methods A-3 and A-5 are described with reference to FIG. 5. The LAA cell 505 receives data reception results 550, 560, 570, 580, 555, 565, 575, and 585 from the UE1 510 and the UE2 511 in the interval [n+4 to n+8] for the data transmitted during the channel occupancy interval 530. Here, the LAA cell 505 may set the interval for receiving the data reception results of the UE for data transmitted in a particular subframe or before or after the particular subframe in the data transmission time (or 1 ms subframe) requiring the A/N transmission of the channel occupancy interval 530 as the contention window configuration reference time for resetting the contention window.

For example, the contention window configuration reference time may be set according to a previously defined A/N transmission time relation of UE between the LAA cell 505 and the UE. When the FDD scheme is used, the previously defined A/N transmission time relation of UE between the LAA cell 505 and the UE indicates that an A/N needs to be transmitted 4 ms after the time when the LAA cell 505 transmits data. Accordingly, the LAA cell 505 may set the contention window configuration reference time using the A/N transmission time relation of UE with respect to the channel occupancy interval 530.

For example, a subframe before the A/N transmission time relation of UE pre-defined with respect to the latest data transmission time (or last 1 ms subframe) of the channel occupancy interval 530 may be set as the contention window configuration reference time. That is, the A/N transmission interval n+4 for subframe n, e.g., the subframe before the A/N transmission time relation for n+4 which is the last channel occupancy time of the channel occupancy interval 530, may be set as the contention window configuration reference time. Here, as in method A-5, the interval before or after subframe n+4 including subframe n may be set as the contention window configuration reference time.

Method A-6 is described with reference to FIG. 5. Time A set by the LAA cell or previously set with respect to the time n when the LAA cell 505 starts to transmit data in the channel occupancy interval 530 or the time n+4 when the LAA cell starts to receive data reception results from the UE1 510 and the UE2 511 for data transmitted during the channel occupancy interval 530 may be set as the contention window configuration reference time. For example, when A=100 ms, the LAA cell 500 may set an interval that is within 100 ms (n+100 or n+104) of the time n when the LAA cell starts to transmit data or the start time n+4 when the LAA cell starts to receive data reception results from the UE1 510 and the UE2 511 for transmitted data may be set as the contention window configuration reference time.

Here, the LAA cell 505 may use the A/N information received from some or all UEs during the set contention window configuration reference time for resetting the contention window. For example, all the UEs transmitting results of data reception during the contention window configuration reference time may be set as contention window varying reference UEs. As another example, the LAA cell 505 may select some UEs from all of the UEs transmitting the data reception results in the contention window configuration reference time based on channel quality information (or an allocated modulation and coding scheme (MCS) value) and set them as the contention window varying reference UEs.

For example, the LAA cell 505 may set the UE having received an allocation of the lowest MCS value within the contention window configuration reference time or the UE having received an allocation of an MCS value within the range selected by the LAA cell 505 or previously set as the contention window varying reference UEs. In other words, the UE having the lowest MCS may be considered the UE receiving largest interference from adjacent devices, and the UE may be used as a contention window varying reference UE. Or, among the UEs transmitting data reception results during the contention window configuration reference time, the LAA cell 505 may set the UE having latest transferred measured channel information to the LAA cell 505 or the UE having transferred a signal separately defined to transfer the UE channel environment as the contention window varying reference UE.

The LAA cell 505 may set a reference UE for resetting the contention window by the above methods alone or in combination. Further, the contention window configuration reference time may be set by the above methods not alone, but by combinations or expanding the methods as well. As an example, in method 1, the contention window configuration reference time may be set with respect to one or more channel sensing intervals of the LAA cell. For example, the interval corresponding to two channel occupancy intervals 530 and 535 may be set as the contention window configuration reference time. The methods and examples suggested above are merely examples and the present disclosure is not limited thereto.

The LAA cell 505 may reset the contention window for the next channel sensing operation using all or some of the data reception results received from the UE using the above methods alone or combinations of the above methods. Here, the LAA cell 505 may use the following methods to vary the contention window applied to the next channel sensing operation using the A/N information received from the contention window configuration reference UE and the contention window configuration reference time.

Method B-1. When at least one or more NACKs are received from the contention window configuration reference UE during the contention window configuration reference time, increase the contention window applied to the next channel sensing operation.

Method B-2. Increase or reduce the contention window applied to the next channel sensing operation based on the ratio or number of NACKs (or ACKs) received from the contention window configuration reference UE during the contention window configuration reference time.

Method B-1 is described in greater detail with reference to FIG. 5. When the contention window configuration reference time is set to [n+4 to n+8] corresponding to the channel occupancy interval 530 of the LAA cell 505 as by method A-1, and all the UEs transmitting the data reception results during the contention window configuration reference time are set as the contention window configuration reference UEs, the LAA cell 505 may increase the contention window since the LAA cell 505 has received the NACK 555 from UE2 511 during the contention window configuration reference time set as above. Here, an example of increasing the contention window may be to use a scheme of exponentially increasing the contention window (e.g., 16→32→64→128, →1024). The exponentially increasing scheme is an example, and the contention window may be varied by other methods including, e.g., a linearly increasing scheme or sequentially or arbitrarily selecting one of contention window candidate values (or set, {16, 32, 64, 256, 1024}).

When the LAA cell 505 fails to receive ACKs or NACKs from the contention window configuration reference UEs during the contention window configuration reference time as set, the LAA cell 505 may determine to have received an NACK to increase the contention window or reuse the preset contention window. When the LAA cell 505 does not receive NACKs from the contention window configuration reference UEs during the contention window configuration reference time as set, the LAA cell 505 does not vary the contention window or may vary the contention window to the initial set value.

Method B-2 is described in greater detail with reference to FIG. 5. When the contention window configuration reference time of the LAA cell 505 is set to [n+4 to n+8] corresponding to the channel occupancy interval 530 of the LAA cell 505, and all the UEs transmitting the data reception results during the contention window configuration reference time are set as the contention window configuration reference UEs, the LAA cell 505 may one NACK 555 from the UE2 511 during the set contention window configuration reference time as shown in FIG. 5. In such scenario, when the case where two or more NACKs or P % (e.g., 10%) or more NACKs are received is set to the contention window variation reference based on method B-2, the LAA cell 505 does not vary the contention window or may reset the contention window to the initial contention window.

When the LAA cell 505 receives two or more NACKs or P % or more NACKs from the contention window configuration reference UEs during the set contention window configuration reference time, the LAA cell 505 may vary the contention window. An example of varying the contention window may be to use a scheme of exponentially increasing the contention window (e.g., 16→32→64→128→ . . . →1024) or a scheme of exponentially decreasing the contention window (e.g., 1024→512→ . . . →32→16). The exponentially increasing scheme is an example and may include e.g., a linearly increasing scheme or sequentially or arbitrarily selecting one of contention window candidate values (or set, {16, 32, 64, 256, 1024}).

When the LAA cell 505 fails to receive ACKs or NACKs from the contention window configuration reference UEs during the contention window configuration reference time as set, the LAA cell 505 may determine to have received an NACK to increase the contention window or reuse the preset contention window.

Figure 6:
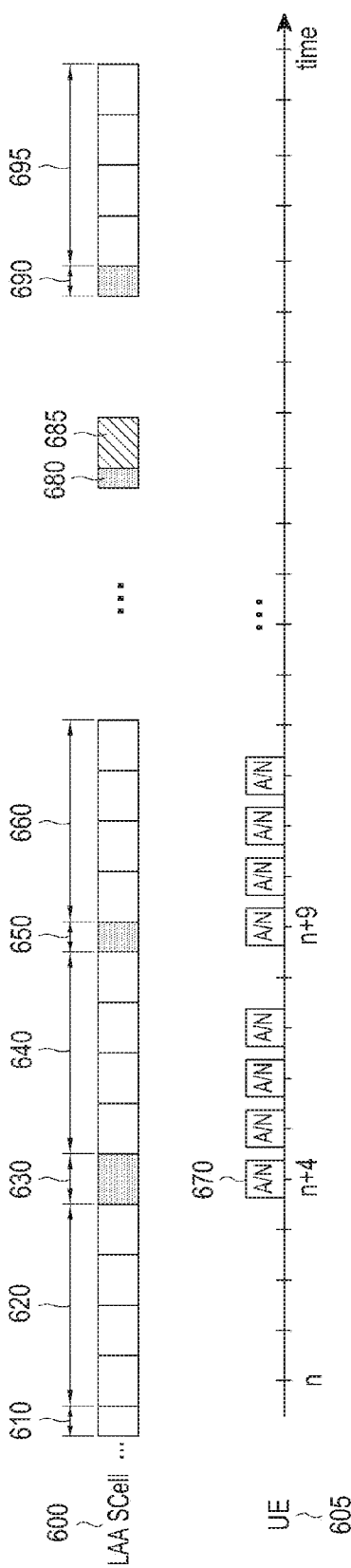
FIG. 6 is a view illustrating an example in which a contention window is configured per transmission of data and control information according to an embodiment of the present disclosure.

FIG. 6 is a view illustrating an example in which a contention window is configured per transmission of data and control information according to an embodiment of the present disclosure.

Referring to FIG. 6, the LAA cell 600 may differently set the way of increasing or decreasing the contention window depending on the type of signal to be transferred by occupying the channel of the LAA cell 600. For example, for channel occupancy for normal data transmission (PDSCH/physical uplink shared channel (PUSCH)), a contention window increasing scheme using exponentially increasing scheme applies, and for channel occupancy for transferring control information ((E)PDCCH/discovery RS, SRS, or CSI-RS), the contention window is set to the initial period to be recycled or a linearly increasing scheme may be utilized.

The contention window varied by the reference and scheme may be applied to the channel sensing operation (e.g., the second channel sensing operation) that occurs after the time that the contention window configuration reference time and contention window configuration reference UE, contention window variation reference and method are determined. However, since a channel sensing operation may be performed before varying the contention window as described above, there is a need for a contention window configuration for the channel sensing operation performed before the contention window varying time. This is described below in detail with reference to FIG. 6.

The LAA cell 600 performs the channel sensing operation during a preset contention window 610 in order to transmit data to the UE 605. The LAA cell 600 determines a channel that is in an idle state depending on the channel sensing operation. The LAA cell 600 may occupy and use the channel during the channel occupancy interval 620. Accordingly, the LAA cell 600 transmits data to the UE 605 during the channel occupancy interval 620.

Here, it is assumed that the contention window configuration reference time of the LAA cell 600 has been set based on method A-2, all the UEs transmitting data reception results during the contention window configuration reference time have been set to contention window configuration reference UEs, and the method for varying the contention window has been set based on method B-1. Then, the LAA cell 600 varies the contention window based on the A/N 674 for the last subframe among the A/Ns for data transmitted during the channel occupancy interval 620.

However, as shown in FIG. 6, the LAA cell 600 may re-perform the channel sensing operation 630 for additional channel occupancy before receiving the A/N 670 for the channel sensing interval 630, i.e., before the time of varying the contention window, and may then occupy the channel occupancy interval 640 depending on the channel sensing result. In the general Wi-Fi system, when the channel is occupied and then re-occupied, the contention window is varied. That is, the contention window is increased or decreased depending on the data reception result of the UE during the channel occupancy interval. For the LAA cell 600, however, since a channel sensing operation 630 may be performed before varying the contention window as described above, there is a need for configuring the contention window for the channel sensing operation 630 performed before the contention window varying time.

The contention window for the channel sensing operation 630 performed before varying the contention window may be set by the following methods.

Method C-1. Reuse the contention window set upon previous channel occupancy.

Method C-2. Use initial contention window value.

Method C-3. Vary depending on UE reception capability received before channel sensing operation.

Method C-1 is described below in greater detail. The contention window for the channel sensing operation 630 performed before the time of varying the contention window as shown in FIG. 6 may be set to be identical to the contention window used for the latest channel sensing operation in preset contention window 610. Another method is to perform the channel sensing operation 630 using the initial contention window value as the contention window for the channel sensing operation 630 performed before the time of varying the contention window or to previously define and use, as a particular interval, the contention window for the channel sensing operation 630 performed before the time of varying the contention window as described above. Still another method is to vary using the A/N information of the UE received before the channel sensing operation 630 performed before the time of varying the contention window. Here, the contention window may be varied using the A/N information of the UE as received by excluding or varying to another scheme at least one reference among the contention window configuration reference UE and the contention window configuration reference time as set above.

The LAA cell 600 may occupy the channel through the channel sensing operation 650 when attempting to re-occupy the channel after the channel occupancy interval 640. Here, the channel sensing operation 650 may be performed using the contention window previously varied.

Further, the LAA cell 600 may use other contention window without using the already varied contention window on the channel sensing operation performed before the contention window varying time. In other words, the channel sensing operation may be performed by abstaining from using the already varied contention window or applying a separately defined contention window depending on the type of signal to be transferred by the LAA cell 600 occupying the channel.

For example, for the channel occupancy for normal data transmission (PDSCH/PUSCH) (e.g., 620, 640, and 660), a previously changed contention window may be used to perform channel sensing operation. Here, when channel occupancy is attempted to transfer control information (e.g., (E)PDCCH, discovery RS, SRS, CSI-RS, etc.) 685, the already varied contention window and other contention window 680 may be used. For example, it may be varied to the initially set contention window and used, or a contention window separately set for transfer of control information may be used to perform channel sensing operation. Here, the channel may be occupied and used without performing a separate channel sensing operation to transfer the control information. When the channel is reoccupied for general data transmission 695 after occupying the channel for control information transfer, the LAA cell 600 may perform a channel sensing operation by using or setting the already set contention window (e.g., the contention window varied through the channel occupancy interval 660) or the contention window (contention window in 650) used upon channel occupancy for existing data transmission to the initial contention window.

Figure 7:
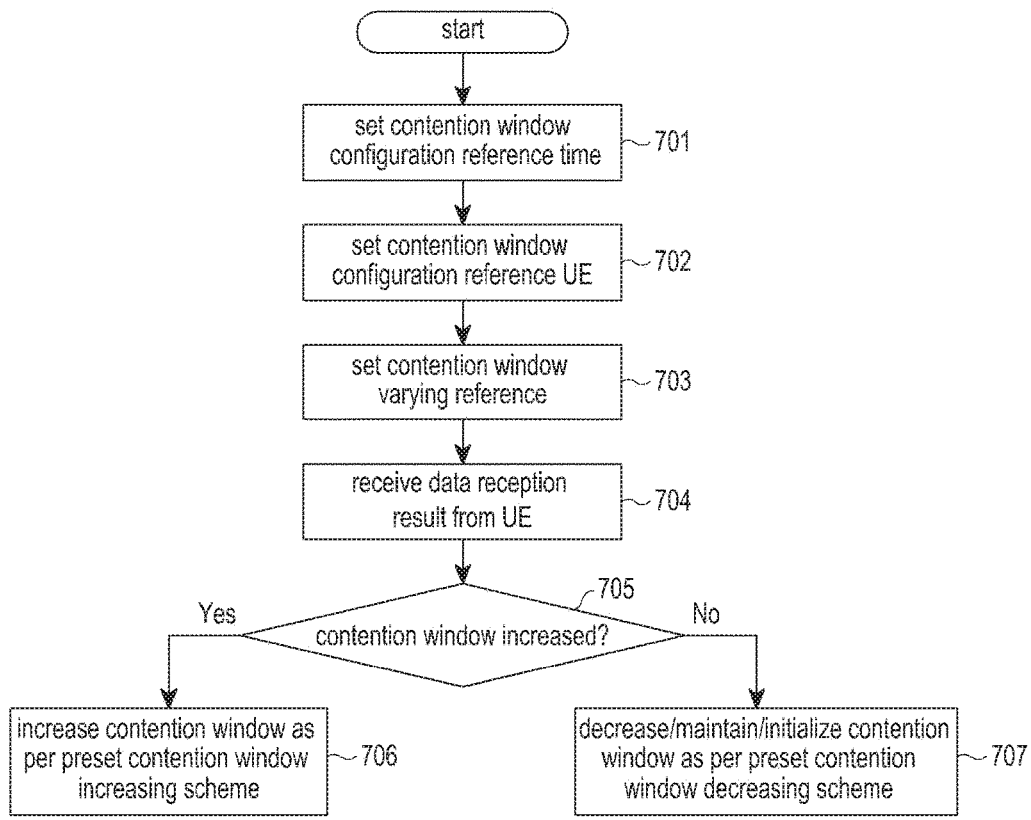
FIG. 7 is a flowchart illustrating a method for configuring a contention window for a channel sensing operation according to an embodiment of the present disclosure.

FIG. 7 is a flowchart illustrating a method for configuring a contention window for a channel sensing operation according to an embodiment of the present disclosure.

Referring to FIG. 7, the LAA cell sets a contention window configuration reference time in operation 701. The LAA cell may set the contention window configuration reference time to a particular time set using the whole or part of the A/N transmission interval of the UE for the channel occupancy time or A/N transmission time relation.

The LAA cell sets a contention window configuration reference UE in operation 702. The LAA cell may set all or some of the UEs performing A/N transmission in the contention window configuration reference time as contention window configuration reference UEs.

The LAA cell sets a contention window varying reference in operation 703. That is, the LAA cell sets the contention window reference based on, e.g., the number or ratio of A/Ns received as per operations 701 and 702.

The LAA cell receives a data reception result transmitted from the contention window configuration reference UE in operation 704. The LAA cell determines whether to vary the contention window in operation 705 based on the contention window varying reference set in operations 701, 702, and 703. For example, the LAA cell receives response signals for multiple data transmitted in the first (or start) subframe of continuous subframes transmitted latest by the LAA cell where response signals may be fed back. The first subframe indicates a subframe where A/N feedback is available in the base station. The LAA cell may determine whether to vary or maintain the contention window based on whether a ratio of NACK signals to the response signals is a preset ratio or more.

When the contention window needs to be increased (e.g., when the ratio of NACKs to the response signals is a predetermined ration (e.g., 80%) or more), the LAA cell increases the contention window by the contention window increasing scheme set in operation 706.

When the contention window need not be increased (e.g., when the ratio of NACKs to the response signals is less than the predetermined ratio), the LAA cell reduces the contention window by the contention window decreasing scheme set in operation 707, maintain the existing contention window, or set the contention window to the initial value.

Figure 8:
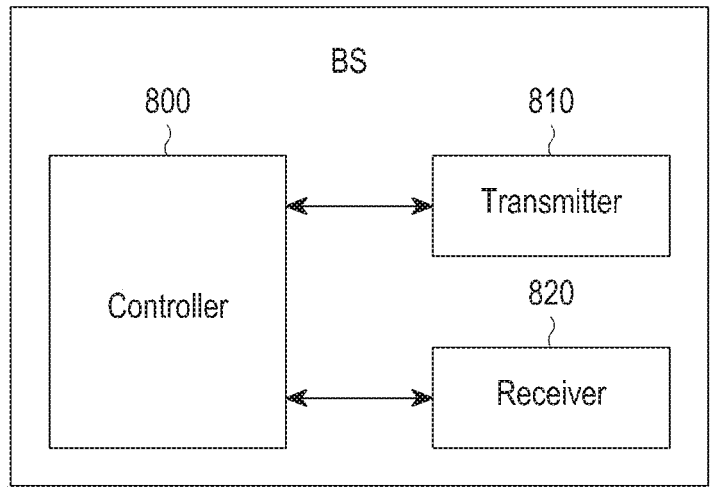
FIG. 8 is a block diagram illustrating a base station according to an embodiment of the present disclosure.

FIG. 8 is a block diagram illustrating a base station according to an embodiment of the present disclosure.

Referring to FIG. 8, the base station includes a controller 800, a transmitter 810, and a receiver 820. The controller 800, the transmitter 810, and the receiver 820 perform the above-described channel occupancy operation and contention window configuration operation on the unlicensed band.

The receiver 820 receives signals from the base station or UE or performs an operation for measuring a channel from the base station or UE. The receiver 820 may perform an operation for sensing the unlicensed band channel using a value set for the channel sensing operation set through the controller 800.

The controller 800 may determine whether the unlicensed band is in an idle state based on information on the unlicensed band sensed by the receiver 820. When it is determined that the unlicensed band is in the idle state, the controller 800 may control the transmitter 810 to transmit a signal for channel occupancy or control channel and data channel information for a particular UE. When it is determined that the unlicensed band is not in the idle state, the controller 800 may control the receiver 820 to continue to perform the channel sensing operation.

The controller 800 may set control channel transmission parameters such as PDCCH/EPDCCH for a particular UE, reference signal transmission parameters of various types, and determine all or some of variables used in a channel sensing operation and parameters required to be set or transferred between the base station and the UE including PDSCH/EPDSCH scheduling. The parameters between the base station and the UE set by the controller 800 may be sent to the UE by controlling the transmitter 810.

Figure 9:
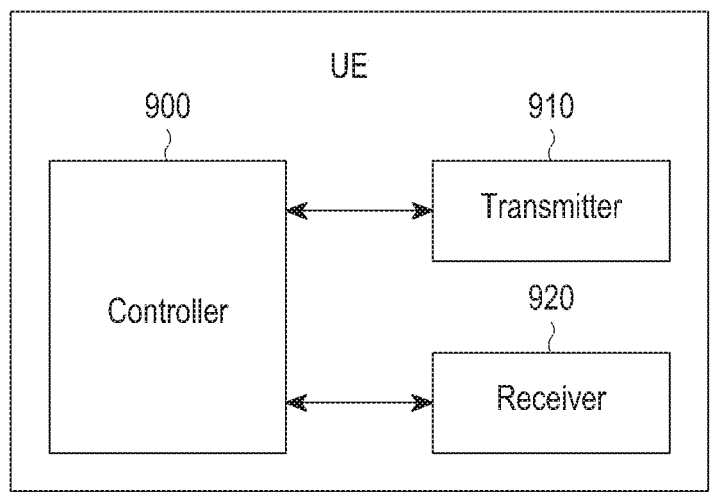
FIG. 9 is a block diagram illustrating a UE according to an embodiment of the present disclosure.

FIG. 9 is a block diagram illustrating a UE according to an embodiment of the present disclosure.

Referring to FIG. 9, the UE includes a controller 900, a transmitter 910, and a receiver 920.

The controller 900 controls the receiver 920 to receive configuration information between base station and UE for signal transmission on the licensed band and unlicensed band from the base station and uses the unlicensed band based on the received configuration information. The controller 900 may obtain the state information of the unlicensed band using at least one of a set value for determining whether scheduling may be made in the subframe where the channel sensing operation is performed as set by the base station and received via the receiver 920, a set value for the signal transmitted through the channel occupancy start symbol of the base station, and unlicensed band state information that may be transmitted to the UE by the base station using the licensed band or other unlicensed band. Further, the controller 900 may determine the result of reception of the data signal received from the base station and may control the transmitter 910 to notify the base station of the data reception result.

The controller 900 may determine the PDSCH/EPDSCH scheduling information from the control information received by the receiver 920. Further, the controller 900 may include a decoder that receives the PDSCH/EPDSCH through the receiver 920 and decodes the PDSCH/EPDSCH.

As is apparent from the foregoing description, according to an embodiment of the present disclosure, it may be possible to reduce the number of times of blind detection by the receiver that determines whether channel is occupied in order to determine whether the transmitter, among devices using unlicensed band, occupies channel.

According to an embodiment of the present disclosure, a contention window in an unlicensed band may be effectively adjusted and used in a wireless communication system, allowing the unlicensed band channel to be effectively used as an additional channel for communication.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing a contention window by a base station in a wireless communication system, the method comprising:
   transmitting multiple data in a first subframe;
   obtaining values of reception result corresponding to the multiple data;
   determining a ratio of negative acknowledge (NACK) signals to the values of reception result;
   adjusting or maintaining the contention window based on the determined ratio;
   setting a value within the contention window as a counter value;
   sensing the channel during a first interval to determine whether the sensed channel is idle;
   if the channel is idle, reducing the counter value and transmitting data in a second subframe using the channel based on the counter value; and
   if the channel is not idle, sensing the channel during a second interval.

2. The method of claim 1, wherein the first subframe is a first subframe of continuous subframes transmitted by the base station.

3. The method of claim 1, wherein the first subframe is a subframe transmitting the multiple data to enable the base station to use at least one response signal.

4. The method of claim 1, wherein the adjusting or the maintaining of the contention window includes increasing the contention window when the ratio of the NACK signals is a predetermined ratio or more.

5. The method of claim 4, wherein the increasing of the contention window includes setting the contention window as a value larger than a currently set contention window value among predetermined contention window candidate values.

6. The method of claim 1, wherein the adjusting or the maintaining of the contention window includes setting the contention window to an initial value when the ratio of the NACK signals is less than a predetermined ratio.

7. The method of claim 6, wherein the setting to the initial value includes setting the contention window as a minimum value of predetermined contention window candidate values.

8. The method of claim 1, wherein the determining of the ratio of the NACK signals includes, upon failure to detect a response signal for each of the multiple data, counting a NACK signal corresponding to corresponding data.

9. The method of claim 1, further comprising:
   if the counter value is larger than a predetermined value, reducing the counter value by a designated value.

10. The method of claim 1, wherein the values of reception result are one of acknowledge (ACK) signal or negative acknowledge (NACK) signal corresponding to the multiple data.

11. A base station in a wireless communication system, the base station comprising:
    a transmitter configured to transmit multiple data in a first subframe;
    a receiver configured to receive response signals corresponding to the multiple data; and
    at least one processor configured to:
       obtain values of reception result corresponding to the multiple data;
       determine a ratio of negative acknowledge (NACK) signals to the values of reception result, adjust or maintain the contention window based on the determined ratio, set a value within the contention window as a counter value, sense the channel during a first interval to determine whether the sensed channel is idle, reduce, if the channel is idle, the counter value and control the transmitter to transmit data in a second subframe using the channel based on the counter value, and sense, if the channel is not idle, the channel during a second interval.

12. The base station of claim 11, wherein the first subframe is a first subframe of continuous subframes transmitted by the base station.

13. The base station of claim 11, wherein the first subframe is a subframe transmitting the multiple data to enable the base station to use at least one response signal.

14. The base station of claim 11, wherein the at least one processor is further configured to increase the contention window when the ratio of the NACK signals is a predetermined ratio or more.

15. The base station of claim 14, wherein the at least one processor is further configured to set the contention window as a value larger than a currently set contention window value among predetermined contention window candidate values.

16. The base station of claim 11, wherein the at least one processor is further configured to set the contention window to an initial value when the ratio of the NACK signals is less than a predetermined ratio.

17. The base station of claim 16, wherein the initial value is a minimum value of predetermined contention window candidate values.

18. The base station of claim 11, wherein the at least one processor, upon failure to detect a response signal for each of the multiple data, is further configured to count a NACK signal corresponding to corresponding data.

19. The base station of claim 11, wherein the at least one processor is further configured to:

reduce, if the counter value is larger than a predetermined value, the counter value by a designated value.

20. The base station of claim 11, wherein the values of reception result are one of acknowledge (ACK) signal or negative acknowledge (NACK) signal corresponding to the multiple data.

* * * * *